United States Patent

Wiese et al.

[11] Patent Number: 5,101,948
[45] Date of Patent: Apr. 7, 1992

[54] VISCOUS COUPLING FOR A DRIVE ASSEMBLY

[75] Inventors: Helmut Wiese, Neunkirchen-Seelscheid; Paul-Erich Schönenbrücher, Much-Kranüchel, both of Fed. Rep. of Germany

[73] Assignee: Viscodrive GmbH, Lohmar, Fed. Rep. of Germany

[21] Appl. No.: 623,281

[22] Filed: Dec. 5, 1990

[30] Foreign Application Priority Data

Dec. 6, 1989 [DE] Fed. Rep. of Germany ....... 3940259

[51] Int. Cl.⁵ ............................................. F16D 35/00
[52] U.S. Cl. ................................ 192/58 B; 192/113 B
[58] Field of Search ......................... 192/58 B, 113 B

[56] References Cited

U.S. PATENT DOCUMENTS

| | | | |
|---|---|---|---|
| 2,879,872 | 3/1959 | Ranst | 192/58 B X |
| 3,823,802 | 7/1974 | Winzeler et al. | 192/113 B |
| 4,040,271 | 8/1977 | Rolt et al. | 192/58 B |
| 4,467,903 | 8/1984 | Hayashi et al. | 192/58 B |
| 4,697,621 | 10/1987 | Diessner et al. | 192/58 B X |
| 4,753,332 | 6/1988 | Bieber et al. | 192/113 B X |
| 4,759,432 | 7/1988 | Jürgene et al. | 192/113 B X |
| 4,782,930 | 11/1988 | Kuroiwa et al. | 192/58 B X |
| 4,886,152 | 12/1989 | Teraoka | 192/113 B X |

FOREIGN PATENT DOCUMENTS 2202602  9/1988  United Kingdom.

Primary Examiner—Leslie A. Braun
Assistant Examiner—Nicholas Whitelaw
Attorney, Agent, or Firm—Toren, McGeady & Associates

[57] ABSTRACT

A viscous coupling having a flushing pump for a drive assembly, in which the abrasion particles occurring as a result of friction between the plates are flushed out of the coupling housing. This is achieved by connecting the viscous coupling to a storage and a supply channel, and the flushing pump is driven as a result of relative movement of the two sets of plates in the viscous coupling and ensures that the viscous fluid flushes the interior of the viscous coupling.

7 Claims, 3 Drawing Sheets

VISCOUS COUPLING FOR A DRIVE ASSEMBLY

BACKGROUND OF THE INVENTION

The invention relates to a viscous coupling having a first coupling part designed as a housing, a second coupling part designed as a hub, at lest two sets of coupling plates, with the first set being non-rotatingly connected to the coupling housing and the second set(s) being non-rotatingly connected to the coupling hub, with the two sets being arranged so as to alternate axially, with at least one set of coupling plates being axially movable to a limited extent, and the remaining interior space being at least partially filled with a viscous fluid whose pressure may be predetemined by a controllable pressure generator consisting of a piston/cylinder unit.

A viscous coupling having a pump for conveying the viscous medium is known from GB 22 02 602 A. The design as described in the patent specification includes a piston pump which permits the internal pressure in the viscous coupling to be changed, with the maximum pressure and the predeterminable pressure being set by two control valves. One of the disadvantages of this design is that as a result of the abrasion of the coupling plates, the viscous fluid is polluted to an increasing extent.

SUMMARY OF THE INVENTION

It is an object of the present invention to improve the prior art viscous coupling in that the abrasion particles resulting from the friction between the plates are flushed out of the coupling housing and at the same time to cool the viscous fluid when high loads are applied.

Pursuant to this object, and others which will become apparent hereafter, one aspect of the present invention resides in providing the viscous coupling with a drainage channel which, for pressurizing purposes, may be closed via a shut-off valve and with a supply channel leading to a storage container, and with a flushing pump and that while being in a pressure-free condition, the interior of the viscous coupling is at least temporarily connected to the flushing pump.

With the help of the flushing pump it is possible to flush the interior of the viscous coupling through the supply and drainage channels. To ensure that the functioning of the viscous coupling is not adversely affected, flushing takes place only in the pressure-free condition of the viscous coupling, which is the reason why the supply channel may be closed by a shut-off valve.

In a further embodiment of the invention, the fluid for flushing the viscous coupling is supplied from the flushing pump into the piston cylinder unit whose piston shuts off the fluid supply during pressurization. This measure permits the supply channel of the pump to be closed automatically through the piston travel when pressure is applied, as a result of which functioning of the viscous coupling is maintained.

In a preferred embodiment, the flushing pump is designed as a vane or hose pump.

According to a further embodiment, the viscous coupling is combined with the flushing pump to form an assembly, with the drive for the flushing pump being derived from the speed differential between the coupling plates of the input and output ends and with the assembly being enclosed by a storage container. By combining the viscous coupling with the flushing pump, the entire assembly is arranged within the storage container, thereby permitting multiple applications in the drive assembly of a motor vehicle.

For cooling the viscous fluid, in a further embodiment, the fluid flow passes through a flow cooler.

The fluid level in the storage container should preferably be kept below the passage apertures for the input and output ends of the assembly consisting of the viscous coupling and flushing pump. In this way it is ensured that the viscous coupling is easy to regulate and control and there is no need for stringent requirements as far as sealing the coupling housing relative to the coupling hub is concerned.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF PREFERRED EMBODIMENTS

Figure 1:
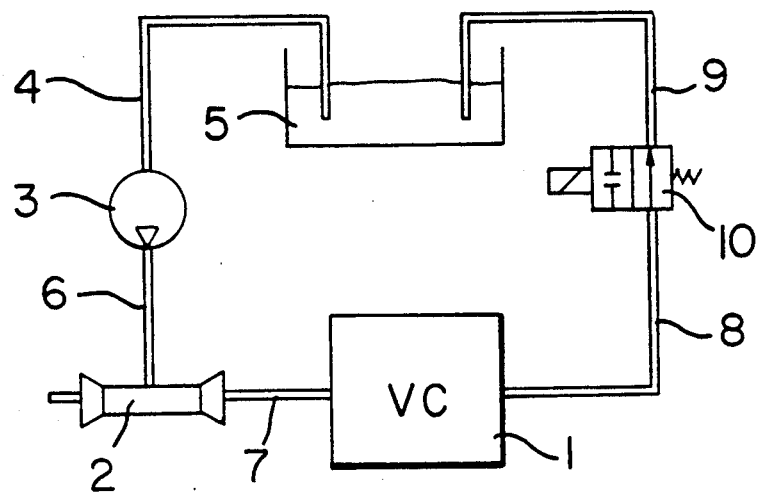
FIG. 1 is a diagrammatic view of the principle of the invention.
Figure 2:
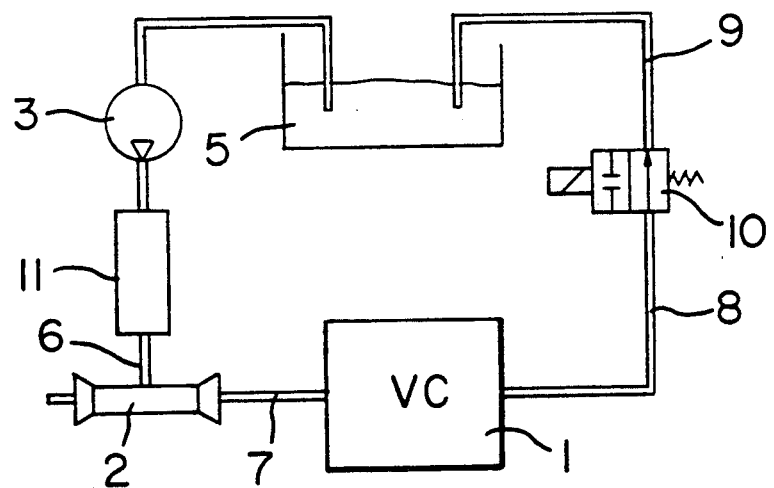
FIG. 2 shows the principle according to FIG. 1 including an additional flow cooler.

FIGS. 1 and 2 illustrate the principle of the invention by showing a sketch of the fluid circuit. A viscous coupling 1 is connected to a flushing pump 3 via a piston/cylinder unit 2. A supply pipe 4 of the flushing pump 3 is connected to a storage container 5 from which the viscous fluid is sucked. Through the flushing pump 3 and via the piston/cylinder unit 2 as well as the connecting pipe 6, 7, the viscous fluid reaches the interior of the viscous coupling 1. Any excess pressure in the viscous coupling 1 is prevented by a further connecting pipeline 8, 9 between the viscous coupling 1 and the storage container 5, with a shut-off valve 10 having a closing function. The connecting pipeline 8, 9 always has to be closed when torque is to be transmitted by the viscous coupling 1 and when the internal pressure is increased by the piston/cylinder unit 2. At the same time, when pressure is applied to the viscous coupling 1, the fluid supply to the flushing pump 3 is blocked by the piston/cylinder unit so that functioning of the viscous coupling 1 is fully ensured.

In FIG. 2, a flow cooler 11 is provided between the flushing pump 3 and the piston/cylinder unit 2 for the purpose of cooling the viscous fluid.

Figure 3:
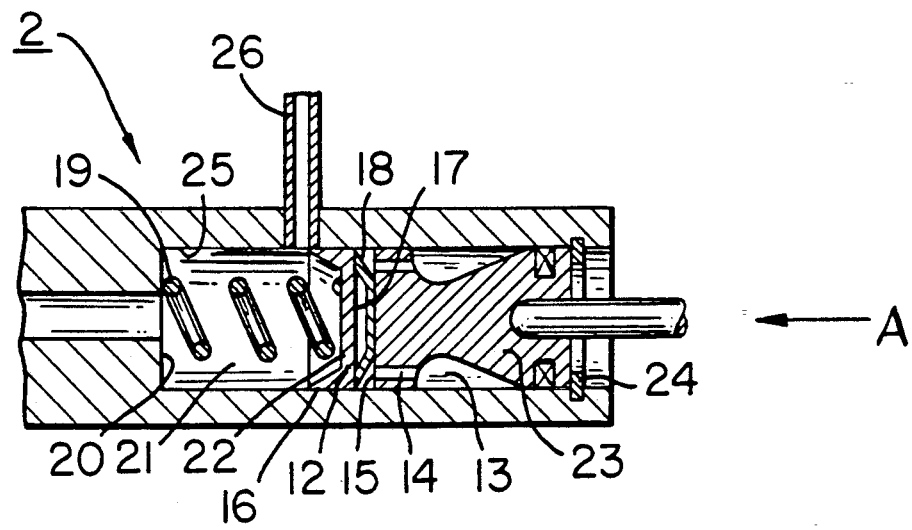
FIG. 3 shows a possible design of the piston/cylinder unit including a supply channel.

FIG. 3 shows an embodiment of the piston/cylinder unit 2. The seal between the interior of the viscous coupling 1 and the piston/cylinder unit 2 consists of a cup-shaped sleeve 12. Axial bores 14 connect the annular space 13 to the piston face 15 at the pressure end. The cup-shaped sleeve 12 comprises a bottom part and a sleeve edge 16. A spring plate 18 is arranged between the outer bottom part 17 of the sleeve 12 and the piston face 15 at the pressure end. A spring 19, one end of which is supported on the bottom face 20 of the cylindrical space 21 and the other end of which is supported on the internal bottom 22 of the sleeve 12, ensures contact between the sleeve 12 and the spring plate 18. At the same time, the spring 19 serves to return the piston 23 into its starting position where it establishes contact with the stop ring 24. The spring plate 18 acts on the outer edge of the sleeve 12. When the load on the piston is reduced in the direction of arrow A, the sealing lips, i.e., the reduced sleeve edge 16, are pressed radially inwardly with the assistance of the spring plate 18 and the resulting vacuum so that the sleeve 12 loses its sealing function, with fluid being able to flow from the annular space 13 via the axial bore 14 between the bore wall 25 and the sleeve edge 16, thereby contributing to an exchange of fluid with the cylindrical space 21. This means that the piston 23 is able to return into its basic position abruptly and without being hindered. A supply bore 26 permits the connection of the flushing pump for the viscous coupling 1.

When the piston 23 is pressurized in the direction of arrow A, the supply bore 26 is closed by the sleeve edge 16 and the piston 23, thereby interrupting the fluid circuit of the flushing pump 3 and permitting the viscous coupling 1 to maintain its full function.

Figure 4:
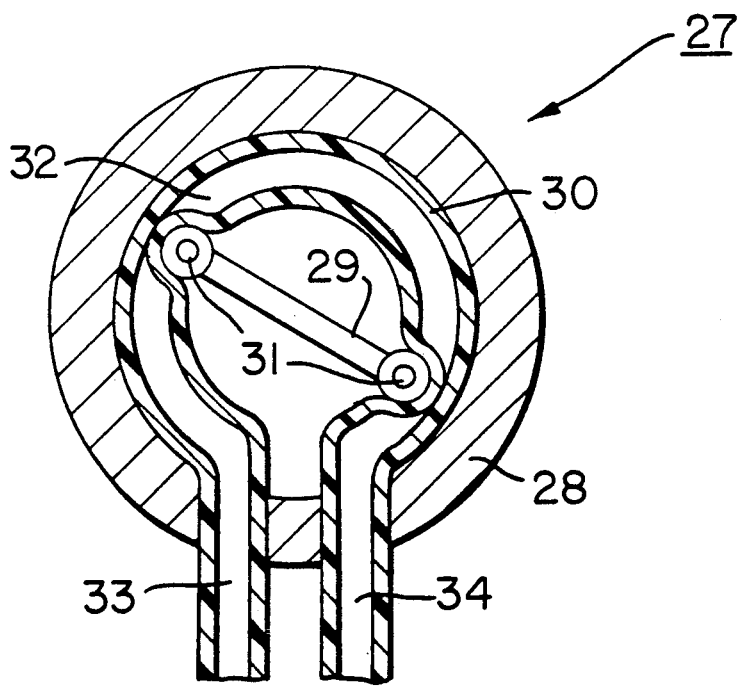
FIG. 4 shows a possible design of the flushing pump in the form of a hose pump.

FIG. 4 is a diagrammatic illustration of the design of a hose pump. The hose pump 27 substantially consists of an annular housing 28 and a central part 29 rotatably supported therein as well as a hose 30 guided therein. The housing 28 and the central part 29 are each associated with a set of plates of the viscous coupling 1. The rotating central part 29, at its radial ends, comprises a spherical thickened portion 31 dimensioned so that that the hose 30 in the annular housing 28 is compressed and forms a transporting space 32. When a speed differential occurs between the set of plates, the hose pump 27 pumps the viscous fluid from an entry aperture 33 to an exit aperture 34, with the pumping direction being determined by the relative direction of rotation. The hose pump 27 operates in a relatively wear-free manner and is insensitive to abrasion particles in the viscous fluid.

Figure 5:
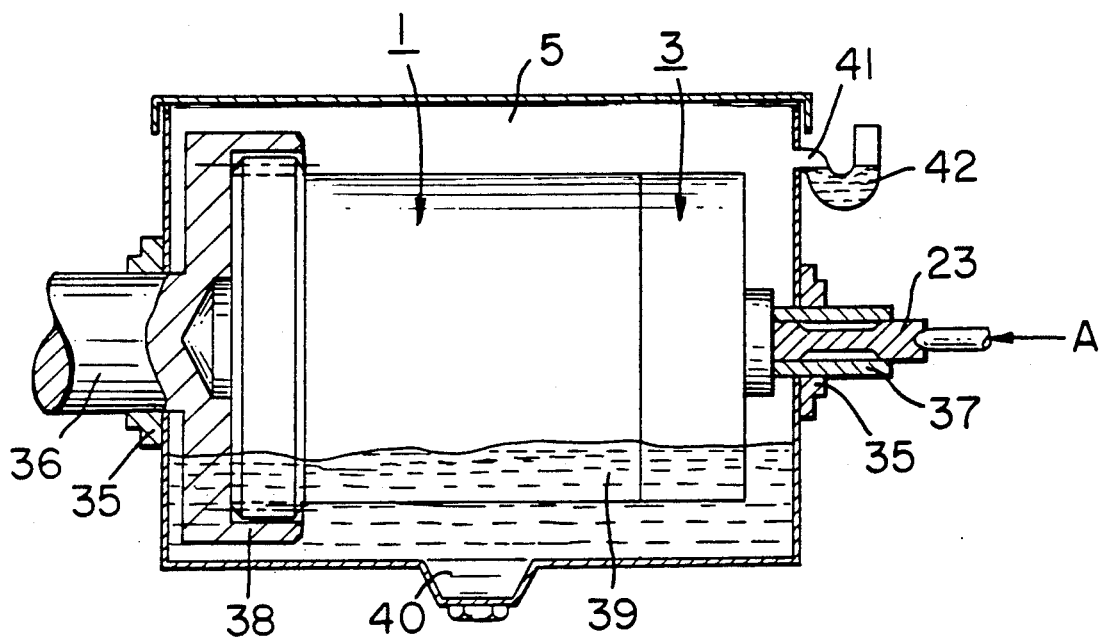
FIG. 5 illustrates the viscous coupling in accordance with the invention, in the case of which the flushing pump is integrated into the viscous coupling.

FIG. 5 shows a first embodiment of the invention comprising a viscous coupling 1 and an integrated flushing pump 3. The entire assembly is surrounded by a storage container 5 which is totally enclosed and which comprises two rotation passages 35 for the input shaft 36 and the output shaft 37. The input shaft 36, with the internal teeth of a connecting flange 38, engages the outer teeth of the first set of plates and drives the viscous coupling 1. At the same time, the first set of plates is connected to the housing 28 of the flushing pump 3. The second set of plates of the viscous coupling 1 is associated with the output end and is connected to the central part 29 of the flushing pump 3 and to the output shaft 37. Pressurization of the viscous coupling 1 in the direction of arrow A is effected via a piston/cylinder unit 2 arranged in the rotation aperture 35 at the output end and in the output shaft 37. The connecting pipeline between the viscous coupling 1 and the flushing pump 3, and the shut-off valve 10 are not illustrated in this figure. The storage container 5 surrounding the assembly comprises a fluid level 39 which is positioned below the two rotation apertures 35, so that there is no need for any special seals. At the lowest point of the non-rotatingly arranged storage container 5 there is provided a deposit bag 40 in which abrasion particles of the set of plates may collect. The ventilation bore 41 ensures pressure compensation if the assembly heats up. Because the ventilation nozzle 42 is designed like a smell excluding trap used for sanitary installations, the ventilation nozzle 42, together with the fluid level, may be regarded as a seal against the outside air so that it is not possible for external dirt to penetrate into the storage container 5. The flushing pump 3 sucks the fluid from the fluid level 39 and pumps it into the viscous coupling 1 via the supply bore (not illustrated). The shut-off valve 10 with its connecting pipelines 8, 9 leading to the viscous coupling 1 is not illustrated, either.

Figure 6:
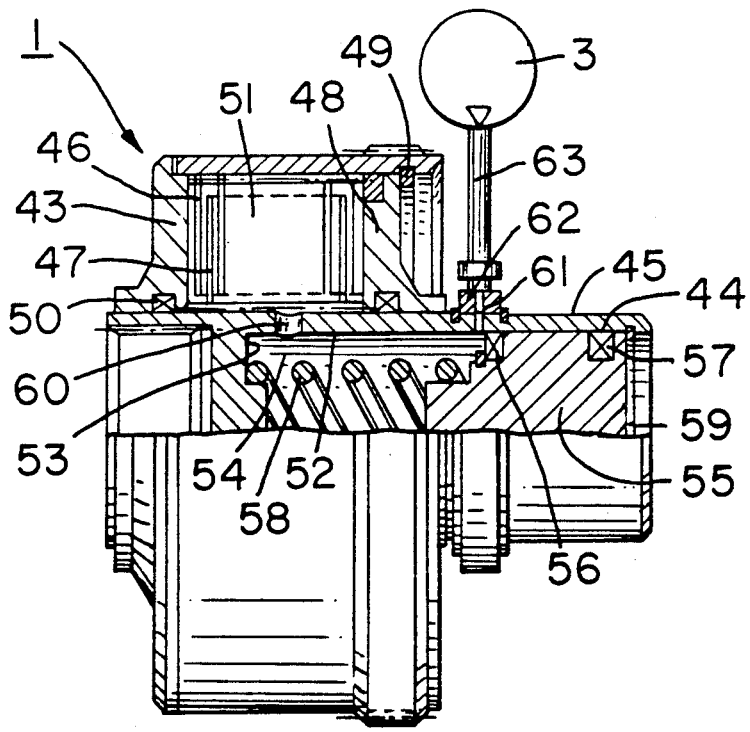
FIG. 6 is a further embodiment of the viscous coupling having an integrated flushing pump.

FIG. 6 shows the design of the viscous coupling 1 having a flushing pump 3. The viscous coupling 1 comprises a coupling housing 43 having a cylindrical casing whose inner face is provided with axially extending, circumferentially distributed teeth. A coupling hub 44 is rotatably supported in the coupling housing 42 so as to extent concentrically thereto. For this purpose, the coupling hub 44, with its outer face 45, is accommodated in corresponding bores in the coupling housing 43. On its outer face 45, the coupling hub 44 comprises a set of circumferentially distributed teeth extending in accordance with the axial length of the coupling housing 43. Plates 46, 47 are associated with the coupling housing 43 and the coupling hub 44, with the plates 46, via outer teeth, being non-rotatingly accommodated in the housing 43, whereas the plates 47, via a toothed bore, are non-rotatingly arranged to the outer circumference of the coupling hub 44. One end of the coupling housing 43 is closed by a housing cover 48 which is sealed relative to the inner wall of the housing 43, and is held in position by a securing ring 49. Furthermore, the housing 43 is sealed via seals 50 relative to the outer face 45 of the coupling hub 44.

The part of the interior 41 of the housing 43 not occupied by the coupling plates 46 and 47 is filled with a viscous fluid. If the housing 43 moves relative to the coupling hub 44, the fluid shears, and with an increasing relative speed, an increasing torque is built up. The torque, additionally, depends on the viscous fluid pressure prevailing in the housing interior. The housing 43 may, for example, be connected to an input end whereas the coupling hub 44 serves as the output end.

The coupling hub 44 is partially hollow and comprises a bore 52. At its end, there is provided a separating wall which represents the bottom 53 of the cylindrical space 54 formed by the bore. A piston 55 is movably supported in the cylindrical space 54, i.e., at the wall of the bore 52. The piston 55 is sealed relative to the wall of the bore 52 by a primary seal 56 and a secondary seal 57. A spring 58 holds the piston 55 in its position which, in the drawing plane, is displaced to the right, and returns it into its position. The withdrawn position is secured by a stop ring 59. The cylindrical space 54 is connected to the interior 51 of the coupling housing 43 via radially extending, circumferentially distributed bores 60 which are arranged in such a way that they end in approximately the center of the axial extension of the housing 43. Furthermore, the casing of the coupling hub is provided with circumferentially distributed supply bores 61. When the piston 55 is in its starting position, i.e., in the uncoupled position in which practically no torque is transmitted between the coupling housing 53 and the coupling hub 44, the supply bore 61 is not covered, but is in contact with the cylindrical space 54. A rotation passage 62 is arranged on the outer face 45 of the coupling hub 44 so as to be movable relative to the coupling hub 44. The supply bore 61 is connected to the flushing pump 3 via a connecting pipeline 63. If the piston 55 is in the position as illustrated in FIG. 6, the viscous fluid contained in the cylindrical space 54 and in the interior 51 of the coupling housing 43 is under atmospheric pressure. If the piston 55 is moved in the direction of the bottom face 53 of the cylindrical space 54 against the force of the spring 58, the supply bore 61 is closed first so that, if the piston 55 is moved further, pressure builds up in the cylindrical space 54 and in the interior 51 of the housing. The pressure build-up ensures that torque can be transmitted between the coupling housing 43 and the coupling hub 44. If the load is removed from the piston 55, it is returned to its starting position under the influence of the spring 58 until the supply bore 61 again establishes a connection between the cylindrical space 54 and the flushing pump 3.

The piston 55 and the bore 52 form a piston/cylinder unit 2. Because of the open connection between the cylindrical space 54 and the interior 51 of the coupling housing 53, on the one hand, and the cylindrical space 54 and the flushing pump 3 via the supply bore 61, on the other hand, flushing of the viscous coupling 1 is ensured. The connecting pipeline between the flushing pump 3 and the storage container and the connecting pipeline between the viscous coupling 1 and the storage container 5 are schematically illustrated in the drawing.

While the invention has been illustrated and described as embodied in a viscous coupling for a drive assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. A viscous coupling (1), comprising:
   a first coupling part formed as a housing;
   a second coupling part formed as a hub;
   at least two sets of coupling plates including a first set non-rotatingly connected to the coupling housing and a second set non-rotatingly connected to the coupling hub, the at least two sets being arranged inside the housing so as to alternate axially, at least one set of coupling plates being axially movable to a limited extent;
   a storage container (5) for viscous fluid, and viscous fluid at least partially filling a remaining interior space of the housing;
   a liquid circulation circuit including a drainage channel (8, 9) arranged so as to lead from the housing to the storage container, and a supply channel (4, 6; 26, 61) arranged so as to lead from the storage container (5) to the interior of the housing;
   a shut-off valve (10) arranged in the drainage channel and being closeable so as to block the drainage and supply channels to generate pressure for torque transmission; and
   a flushing pump (3) connected to the liquid circulation circuit, the channels being at least temporarily openable during a state of no torque transmission so that the interior of the viscous coupling is at least temporarily connected to the flushing pump (3).

2. A viscous coupling according to claim 1, and further comprising a controllable pressure generator for predetermining pressure of the viscous fluid in the housing (5), the pressure generator including a piston/cylinder unit (2) with which the supply channel (26, 61) is integral, the piston/cylinder unit (2) having a piston (65) which blocks the supply channel during pressurization.

3. A viscous coupling according to claim 1, wherein the flushing pump (3) is a vane pump.

4. A viscous coupling according to claim 1, wherein the flushing pump (3) is a hose pump (27).

5. A viscous coupling according to claim 1, wherein the viscous coupling is combined with the flushing pump (3) so as to form a single assembly, the flushing pump (3) having a drive derived from a speed differential between the coupling plates of the input and output end of the assembly, the assembly being enclosed by the storage container (5).

6. A viscous coupling according to claim 1, and further comprising a flow cooler (11) incorporated into the fluid circuit of the flushing pump (3) so as to cool the viscous fluid.

7. A viscous coupling according to claim 5 wherein, the fluid in the storage container (5) is kept at a level below the passage apertures for the input and output ends of the assembly.

* * * * *